United States Patent
Anand et al.

(10) Patent No.: US 9,516,145 B2
(45) Date of Patent: *Dec. 6, 2016

(54) METHOD OF EXTRACTING DATA FROM PACKETS AND AN APPARATUS THEREOF

(71) Applicant: CAVIUM, INC, San Jose, CA (US)

(72) Inventors: Vishal Anand, Saratoga, CA (US); Tsahi Daniel, Palo Alto, CA (US); Gerald Schmidt, San Jose, CA (US)

(73) Assignee: Cavium, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/309,726

(22) Filed: Jun. 19, 2014

(65) Prior Publication Data

US 2015/0373163 A1    Dec. 24, 2015

(51) Int. Cl.

| | |
|---|---|
| *H04L 12/28* | (2006.01) |
| *H04L 29/06* | (2006.01) |
| *H04L 12/931* | (2013.01) |
| *H04L 12/741* | (2013.01) |
| *H04L 12/933* | (2013.01) |
| *H04L 29/12* | (2006.01) |
| *H04L 12/46* | (2006.01) |

(52) U.S. Cl.
CPC ........... *H04L 69/22* (2013.01); *H04L 12/4641* (2013.01); *H04L 45/74* (2013.01); *H04L 49/00* (2013.01); *H04L 49/10* (2013.01); *H04L 61/2007* (2013.01); *H04L 69/03* (2013.01)

(58) Field of Classification Search
CPC ...... H04L 69/22; H04L 12/4641; H04L 49/10; H04L 61/2007; H04L 45/74; H04L 69/03; H04L 49/00

See application file for complete search history.

(56) References Cited

U.S. PATENT DOCUMENTS

| | | |
|---|---|---|
| 5,805,808 A | 9/1998 | Hasani et al. |
| 6,088,356 A | 7/2000 | Hendel et al. |
| 6,341,129 B1 | 1/2002 | Schroeder et al. |
| 6,789,116 B1 | 9/2004 | Sarkissian et al. |
| 7,187,694 B1 | 3/2007 | Liao |
| 7,359,403 B1 | 4/2008 | Rinne |
| 7,568,047 B1 | 7/2009 | Aysan et al. |
| 7,606,263 B1 | 10/2009 | Parker |
| 7,822,032 B1 | 10/2010 | Parker et al. |
| 7,903,689 B2 | 3/2011 | Niinomi et al. |
| 8,144,706 B1 | 3/2012 | Daniel et al. |
| 8,705,533 B1 | 4/2014 | Venkatraman et al. |
| 2001/0050914 A1 | 12/2001 | Akahane et al. |

(Continued)

*Primary Examiner* — Clemence Han
(74) *Attorney, Agent, or Firm* — Haverstock & Owens LLP

(57) ABSTRACT

Embodiments of the apparatus for extracting data from packets relate to programmable layer commands that allow fields from packets to be extracted. A packet is split into individual layers. Each layer is given a unique layer type number that identifies the layer. Based on the layer type, each layer is expanded to a generic format. Each layer has a set of layer commands that is generic to that layer. Fields of each layer command are fieldOffset and fieldLen. These layer commands allow information in the packet to be extracted in a programmable manner. Extracted fields from each protocol layer are concatenated to form a token layer. All token layers are concatenated to form a final token, which is used for further processing of the packet.

38 Claims, 8 Drawing Sheets

(56) References Cited

U.S. PATENT DOCUMENTS

| | | |
|---|---|---|
| 2002/0016852 A1 | 2/2002 | Nishihara |
| 2002/0083210 A1 | 6/2002 | Harrison et al. |
| 2002/0163935 A1 | 11/2002 | Paatela et al. |
| 2002/0191521 A1 | 12/2002 | Minamino et al. |
| 2003/0152078 A1 | 8/2003 | Henderson et al. |
| 2003/0193949 A1 | 10/2003 | Kojima et al. |
| 2003/0210702 A1 | 11/2003 | Kendall |
| 2003/0231625 A1 | 12/2003 | Calvignac et al. |
| 2005/0213570 A1 | 9/2005 | Stacy et al. |
| 2005/0232303 A1 | 10/2005 | Deforche et al. |
| 2005/0276230 A1 | 12/2005 | Akahane et al. |
| 2005/0281281 A1 | 12/2005 | Nair et al. |
| 2006/0039372 A1 | 2/2006 | Sarkinen et al. |
| 2006/0168309 A1 | 7/2006 | Sikdar et al. |
| 2006/0280178 A1 | 12/2006 | Miller et al. |
| 2007/0078997 A1 | 4/2007 | Stern |
| 2008/0008159 A1* | 1/2008 | Bourlas ............... H04L 69/32 370/352 |
| 2009/0067325 A1 | 3/2009 | Baratakke et al. |
| 2009/0234818 A1 | 9/2009 | Lobo et al. |
| 2009/0238190 A1* | 9/2009 | Cadigan, Jr. ......... H04L 12/462 370/395.53 |
| 2010/0161787 A1 | 6/2010 | Jones |
| 2010/0272125 A1* | 10/2010 | Franke ................. H04L 69/12 370/476 |
| 2010/0329255 A1 | 12/2010 | Singhal |
| 2011/0022732 A1 | 1/2011 | Hutchison et al. |
| 2011/0058514 A1* | 3/2011 | Lee .................... H04B 7/2606 370/315 |
| 2011/0134920 A1* | 6/2011 | Dyke ................... H04L 45/60 370/392 |
| 2011/0142070 A1 | 6/2011 | Lim et al. |
| 2011/0261812 A1* | 10/2011 | Kini ................... H04L 12/4633 370/389 |
| 2011/0268123 A1 | 11/2011 | Kopelman et al. |
| 2011/0310892 A1 | 12/2011 | DiMambro |
| 2012/0281714 A1 | 11/2012 | Chang et al. |
| 2013/0039278 A1* | 2/2013 | Bouazizi ............. H04L 65/4076 370/328 |
| 2013/0163427 A1 | 6/2013 | Beliveau et al. |
| 2013/0163475 A1 | 6/2013 | Beliveau et al. |
| 2013/0215906 A1 | 8/2013 | Hidai |
| 2013/0238792 A1 | 9/2013 | Kind et al. |
| 2014/0119231 A1* | 5/2014 | Chan .................... H04L 47/115 370/253 |
| 2014/0269307 A1 | 9/2014 | Banerjee et al. |
| 2014/0328354 A1* | 11/2014 | Michael ............... H04N 21/643 370/474 |
| 2014/0369365 A1* | 12/2014 | Denio ................... H04L 69/16 370/474 |
| 2015/0081726 A1* | 3/2015 | Izenberg ........... G06F 17/30943 707/755 |
| 2015/0189047 A1* | 7/2015 | Naaman ........... G06F 17/30943 370/474 |
| 2015/0222533 A1* | 8/2015 | Birrittella ............ H04L 45/66 370/392 |

* cited by examiner

Format of a double tagged Ethernet header

Bit Vector

Byte Numbering

Format of a single tagged Ethernet header
| SA (6 Bytes) | DA (6 Bytes) | Customer VLAN Tag (4Bytes) | ETHERTYPE (2Bytes) |
|---|---|---|---|
Fig. 3A
Format of the single tagged Ethernet header in generic format
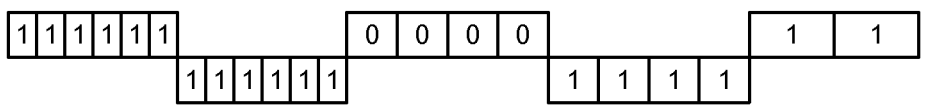
Fig. 3B
Bit Vector
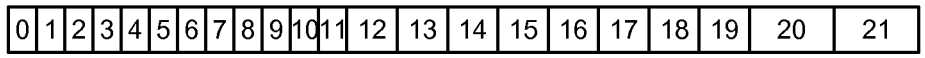
Byte Numbering
| 0 | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
Fig. 3C

Format of an untagged Ethernet header

| SA (6 Bytes) | DA (6 Bytes) | ETHERTYPE (2Bytes) |
|---|---|---|

Fig. 4A

Format of the untagged Ethernet header in generic format

| SA (6 Bytes) | DA (6 Bytes) | Service VLAN Tag (4Bytes) Marked Invalid | Customer VLAN Tag (4Bytes) Marked Invalid | ETHERTYPE (2Bytes) |
|---|---|---|---|---|

Fig. 4B

Bit Vector

| 1 | 1 | 1 | 1 | 1 | 1 | 1 | 1 | 1 | 1 | 1 | 1 | 0 | 0 | 0 | 0 | 0 | 0 | 0 | 0 | 1 | 1 |
|---|---|---|---|---|---|---|---|---|---|---|---|---|---|---|---|---|---|---|---|---|---|

Byte Numbering

| 0 | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|

Fig. 4C

METHOD OF EXTRACTING DATA FROM PACKETS AND AN APPARATUS THEREOF

FIELD OF INVENTION

The present invention relates to network packets. More particularly, the present invention relates to a method of extracting data from packets and an apparatus thereof.

BACKGROUND OF THE INVENTION

In order to process network packets, such as Ethernet packets, it is necessary to extract certain fields from the packets. The values contained in extracted fields help decide how a packet should be handled. For example, switching utilizes the 48-bit MAC destination address inside the Ethernet header to decide which port the packet should be sent to. Similarly, routing utilizes the 32-bit destination IP address contained within the IPv4 layer. Current hardware solutions utilize fixed extraction mechanisms to extract such information from the packets. Determination of where relevant information to be extracted lies within the packet is made at implementation time. However, current hardware solutions cannot handle evolving networking protocols.

BRIEF SUMMARY OF THE INVENTION

Embodiments of the apparatus for extracting data from packets relate to programmable layer commands that allow fields from packets to be extracted. A packet is split into individual layers. Each layer is given a unique layer type number that identifies the layer. Based on the layer type, each layer is expanded to a generic format. Each layer has a set of layer commands that is generic to that layer. Fields of each layer command are fieldOffset, which specifies offset within the layer where a field to be extracted starts, and fieldLen, which specifies the number of bytes to be extracted from that specified offset. These layer commands allow information in the packet to be extracted in a programmable manner. Extracted fields from each protocol layer are concatenated to form a token layer. All token layers are concatenated to form a final token, which is used for further processing of the packet.

In one aspect, a method of implementing a parser engine is provided. The method includes identifying protocol layers of a packet, expanding each of the protocol layers to a generic format based on the identification of that protocol layer, and selecting contents form the expanded protocol layers to thereby form a final token.

In some embodiments, each of the protocol layers of the packet is identified based on a unique layer type number of the protocol layer.

In some embodiments, the generic format defines a superset of all fields that the protocol layer can have.

In some embodiments, expanding each of the protocol layers include maintaining a bit vector for an expanded protocol layer, wherein the bit vector includes a bit per byte for each byte of the expanded protocol layer, marking a bit as available for each byte of each valid field, wherein each valid field is a field existing in the protocol layer of the packet, and marking a bit as unavailable for each byte of each invalid field, wherein each invalid field is a field that did not exist in the protocol layer of the packet.

In some embodiments, the method also includes using a compressed format to express the expanded protocol layer.

In some embodiments, the method also includes applying at least one from a set of generic layer commands is applied to an expanded protocol layer to extract a field from the expanded protocol layer. Fields of each of the generic layer commands are fieldOffset, which specifies offset within the expanded layer where a field to be extracted starts, and fieldLen, which specifies a number of bytes that should be extract from that specified offset. In some embodiments, the fields of each of the generic layer commands are software defined.

In some embodiments, the method further includes forming a token layer based on at least the extracted field, and forming the final token based on at least the token layer. The token layer is formed by placing the extracted field together with other extracted fields from the expanded protocol layer without any gaps. The final token is formed by placing the token layer together with other token layers without any gaps. The final token can be used for further processing of the packet.

In another aspect, a method of implementing a network switch is provided. The method includes receiving a packet at an incoming port of the network switch, generalizing each protocol header of the packet according to a generic format for a corresponding protocol, for each generalized protocol header, extracting one or more fields from the generalized protocol headers, for each generalized protocol header, concatenating the one or more extracted fields from the generalized protocol header to form a token layer, and concatenating all token layers to form a final token.

In some embodiments, the network switch includes a parser engine configured to generalize each protocol header, to extract one or more fields from the generalized protocol header, to concatenate the one or more extracted fields from the generalized protocol headers to form a token layer, and to concatenate all token layers to form a final token.

In some embodiments, generalizing each protocol header includes the parser engine determining a layer type of the protocol header and a variant of the layer type, the parser engine detecting missing fields from the protocol based on the layer type and the variant, and based on the detection, the parser engine expanding the protocol header to the generic format.

In some embodiments, extracting one or more fields includes applying one or more generic layer commands to the generalized protocol header. Fields of each of the generic layer commands are fieldOffset, which specifies offset within the expanded layer where a field to be extracted starts, and fieldLen, which specifies a number of bytes that should be extract from that specified offset.

In some embodiments, prior to receiving a packet, the method includes programming fields of each of the one or more generic layer commands via software.

In some embodiments, prior to receiving a packet, the method includes allowing for software-defined mappings of generic formats of protocols and storing the software-defined mappings in the memory of the network switch.

In yet another aspect, a network switch is provided. The network switch includes an input port and an output port for receiving and transmitting packets. The network switch also includes a memory for storing a set of software-defined mappings of generic formats of protocols and for storing sets of generic layer commands for extracting fields. The network switch also includes a parser engine for performing a header generalization process on the packet to generalize each protocol header of a packet according to one of the software-defined mappings that is specific to a corresponding protocol, and for selecting contents from the generalized protocol headers to thereby form a final token. The header generalization process can be used on different variants of a protocol, on different protocols, or both.

In some embodiments, after the packet is processed by the parser engine, the packet includes canonicalized protocol layers. Each of the canonicalized protocol layers is a protocol layer expanded according to corresponding generic format for the corresponding protocol.

In some embodiments, the parser engine further applies at least one layer command from one of the sets of generic layer commands to each of the generalized protocol layers to extract a field from the generalized protocol layer. In some embodiments, the one of the set of generic layer commands is specific to the corresponding protocol. In some embodiments, fields of each of the generic layer commands are software defined.

In some embodiments, the extracted field is concatenated with other extracted fields from the generalized protocol layer to form a token layer. In some embodiments, the token layer is concatenated with other token layers to form a final token. In some embodiments, the final token is used for further processing of the packet.

In yet another aspect, a parser engine is provided. The parser includes circuit configured to identify protocol layers of a packet, expand each of the protocol layers to a generic format based on the identification of that protocol layer, and select contents from the expanded protocol layers to thereby form a final token.

In some embodiments, each of the protocol layers of the packet is identified based on a unique layer type number of the protocol layer. In some embodiments, the generic format defines a super-set of all fields that the protocol layer can have.

In some embodiments, the circuit is also configured to apply at least one from a set of generic layer commands to an expanded protocol layer to extract a field from the expanded protocol layer. In some embodiments, fields of each of the generic layer commands are fieldOffset, which specifies offset within the expanded layer where a field to be extracted starts, and fieldLen, which specifies a number of bytes that should be extract from that specified offset. In some embodiments, the fields of each of the generic layer commands are software defined.

In some embodiments, the circuit is also configured to form a token layer based on at least the extracted field and to form the final token based on at least the token layer. In some embodiments, the token layer is formed by placing the extracted field together with other extracted fields from the expanded protocol layer without any gaps. In some embodiments, the final token is formed by placing the token layer together with other token layers without any gaps.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 3A-3C illustrate another exemplary generalization of a protocol header in accordance with some embodiments of the present invention.

FIGS. 4A-4C illustrate another exemplary generalization of a protocol header in accordance with some embodiments of the present invention.

DETAILED DESCRIPTION OF THE INVENTION

Figure 1:
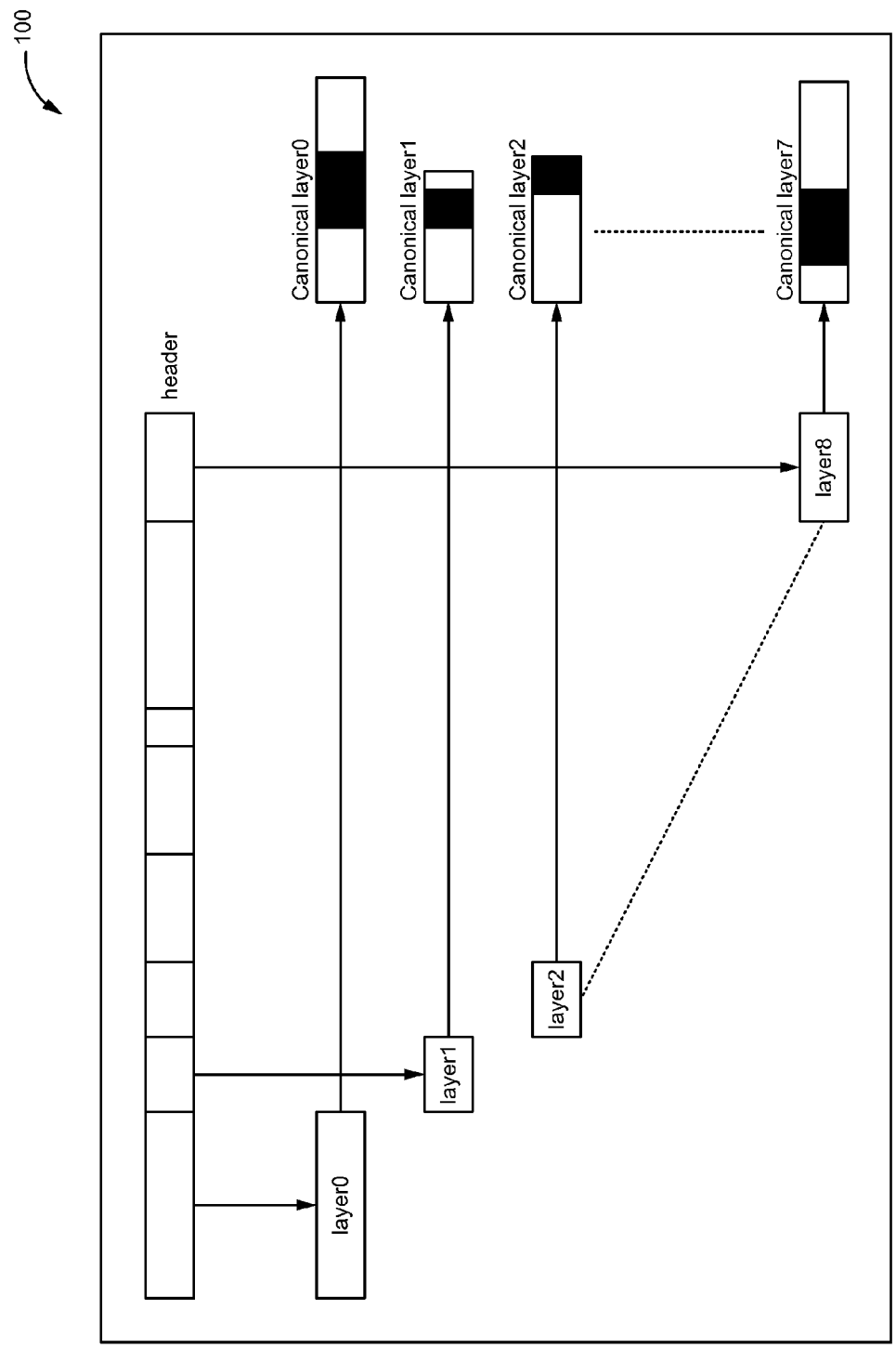
FIG. 1 illustrates a diagram of header expansion of layers of an incoming packet to generic formats in accordance with some embodiments of the present invention.

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein.

Embodiments of the apparatus for extracting data from packets relate to programmable layer commands that allow fields from packets to be extracted. A packet is split into individual layers. Each layer is given a unique layer type number that identifies the layer. Based on the layer type, each layer is expanded to a generic format. Each layer has a set of layer commands that is generic to that layer. Fields of each layer command are fieldOffset, which specifies offset within the layer where a field to be extracted starts, and fieldLen, which specifies the number of bytes to be extracted from that specified offset. These layer commands allow information in the packet to be extracted in a programmable manner. Extracted fields from each protocol layer are concatenated to form a token layer. All token layers are concatenated to form a final token, which is used for further processing of the packet.

A network device, such as a network switch, is able to switch/route network traffic. The network switch includes at least one input/incoming port and at least one output/outgoing port for receiving and transmitting packets. In some embodiments, the network switch also includes a parser and a rewriter. The parser can include one or more parser engines to identify contents of network packets, and the rewriter can include one or more rewrite engines to modify packets before they are transmitted out from the network switch. The parser engine(s) and the rewrite engine(s) are flexible and operate on a programmable basis.

The network switch also includes memory to store data used by the network switch. For example, the memory stores a set of generic layer commands. Briefly, the generic layer commands are typically used to extract fields from protocol headers. For another example, the memory also stores software-defined mappings of generic formats of protocols. Briefly, each protocol header is represented according to one of the software-defined mappings that is specific to a corresponding protocol. As it will become evident, these mappings can be used on different variants of a protocol as well as on different protocols, including new protocols. For yet another example, the memory also stores counters and statistics.

In Ethernet, packets include multiple protocol layers. Each protocol layer carries different information. Some examples of well known layers are:
Ethernet
PBB Ethernet
ARP
IPV4
IPV6
MPLS
FCOE
TCP
UDP
ICMP
IGMP
GRE
ICMPv6
VxLAN
TRILL
CNM Theoretically, the protocol layers can occur in any order. However, only some well-known combinations of these layers occur. Some examples of valid combinations of these layers are:
Ethernet
Ethernet, ARP
Ethernet, CNM
Ethernet, FCoE
Ethernet, IPV4
Ethernet, IPV4, ICMP
Ethernet, IPV4, IGMP For packet parsing (and rewrite) operations, a packet is broken into layers. This split is done based on well-known layers such as those listed above. Many of the layers have different types of combinations of fields within them. In order to effectively handle the different possible combinations, the layers are expanded into generic formats. These generic formats allow use of commands, such as layer commands, that are agnostic of the specific fields within the layers. A generic form defines a super-set of all fields that any known layer can have.

FIG. 1 illustrates diagram 100 of header expansion of layers of an incoming packet to generic formats in accordance with some embodiments of the present invention. In FIG. 1, the incoming packet includes eight header protocol layers. Each protocol layer typically includes a header for its respective protocol. More or less protocol layers are possible as indicated above. The parser engine is able to identify each layer and a variant thereof. The parser engine expands each protocol layer based on the identification and variant of the layer, as illustrated in FIG. 1. A canonical layer refers to a protocol layer that has been expanded to its generic format. Briefly, each canonical layer includes a bit vector with bits marked as 0 for invalid fields and bits marked as 1 for valid fields.

Assume the parser engine has identified a layer as being an Ethernet packet header. FIGS. 2A-4C illustrate examples of how the parser engine works on the Ethernet protocol in accordance with some embodiments of the present invention. The examples illustrated in FIGS. 2A-4C demonstrate that the parser engine is able to work on different variants of a protocol, such as the Ethernet protocol. Each example illustrates an incoming header of the Ethernet protocol and its corresponding generic format. Although other protocols are not discussed, it is noted that the parser engine works similarly on the other protocols.

Figure 2A:
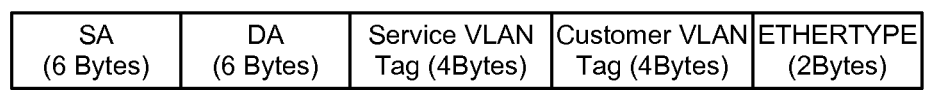
FIGS. 2A-2B illustrate an exemplary generalization of a protocol header in accordance with some embodiments of the present invention.

FIG. 2A illustrates a format 200 of an exemplary Ethernet packet header of an incoming packet. The Ethernet packet header 200 is 22 bytes and includes five fields: a Source Address (SA) field, a Destination Address (DA) field, a Service VLAN Tag field, a Customer VLAN Tag field and an EtherType field. The SA field and the DA field are each 6 bytes. The Service VLAN Tag field and the Customer VLAN Tag field are each 4 bytes. The EtherType field is 2 bytes. The packet with the Ethernet packet header 100 is the biggest variant of an Ethernet packet and has the maximum size of 22 bytes.

Figure 2B:
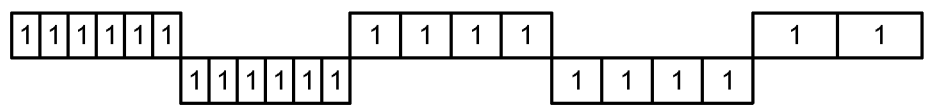
Figure 2B:
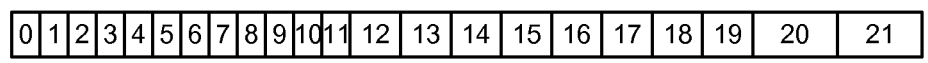

The parser engine processes the Ethernet packet header 200 and determines that none of the fields are missing from the Ethernet packet header 200. A generic format of the Ethernet packet header 200 is thus the same as that of the Ethernet packet header 200 since the Ethernet packet header 200 contains all possible fields. FIG. 2B illustrates a bit vector 205 that represents the Ethernet packet header 200 of FIG. 2A. Each bit of the bit vector 205 corresponds to one of the 22 bytes of the Ethernet packet header 200. The bit vector 205 contains all 1's since all the fields of the Ethernet packet header 200 are valid or have values as the fields exist in the Ethernet packet header 200. Accordingly, the Ethernet packet header 200 is represented by the generic format of {22'b111111_111111_1111_1111_11}.

FIG. 3A illustrates a format 300 of another exemplary Ethernet packet header of an incoming packet. The Ethernet packet header 300 is 18 bytes and includes only four fields: the SA field, the DA field, the Customer VLAN Tag field and the EtherType field. The Ethernet packet header 300 is missing the Service VLAN tag field. The packet with the Ethernet packet header 300 is another variation of an Ethernet packet.

The parser engine processes the Ethernet packet header 300 and determines that the Service VLAN tag field is missing from the Ethernet packet header 300 and expands the Ethernet packet header 300 to its maximum size of 22 bytes by including the missing Service VLAN tag field at the appropriate location of a generic format of the Ethernet packet header 300. FIG. 3B illustrates the generic format 300' of the expanded Ethernet packet header. The expanded Ethernet packet header 300' includes all possible fields of the Ethernet protocol, including the missing Service VLAN tag field. The valid fields in the expanded Ethernet packet header 300' are the SA field, the DA field, the Customer VLAN Tag field and the EtherType field, as they exist in the Ethernet packet header 300. The invalid field in the expanded Ethernet packet header 300' is the Service VLAN tag field, as it did not exist in the Ethernet packet header 300 but is added in the expanded Ethernet packet header 300'.

FIG. 3C illustrates a bit vector 305 that represents the expanded Ethernet packet header 300' of FIG. 3B. Each bit of the bit vector 305 corresponds to one of the 22 bytes of the expanded Ethernet packet header 300'. The bit vector 305 contains 1's for all valid fields, which are the SA field, the DA field, the Customer VLAN Tag field and the EtherType field. The bit vector 305 contains 0's for all invalid fields, which is only the Service VLAN tag field. Accordingly, the Ethernet packet header 300 is represented by the generic format of {22'b111111_111111_0000_1111_11}.

FIG. 4A illustrates a format 400 of another exemplary Ethernet packet header of an incoming packet. The Ethernet packet header 400 is 14 bytes and includes only three fields: the SA field, the DA field and the EtherType field. The Ethernet packet header 400 is missing the Service VLAN tag field and the Customer VLAN Tag field. The packet with the Ethernet packet header 400 is the smallest variant of an Ethernet packet.

The parser engine processes the Ethernet header 400 and determines that the Service VLAN tag field and the Customer VLAN Tag field are missing from the Ethernet packet header 400 and expands the Ethernet packet header 400 to its maximum size of 22 bytes by including the missing Service VLAN tag field and the missing Customer VLAN Tag field at the appropriate locations of a generic format of the Ethernet packet header 400. FIG. 4B illustrates a generic format 400' of the expanded Ethernet packet header. The expanded Ethernet packet header 400' includes all possible fields of the Ethernet protocol, including the missing Service VLAN tag field and missing the Customer VLAN Tag field. The valid fields in the expanded Ethernet packet header 400' are the SA field, the DA field and the EtherType field, as they exist in the Ethernet packet header 400. The invalid fields in the expanded Ethernet packet header 400' are the Service VLAN tag field and the Customer VLAN Tag field, as they did not exist in the Ethernet packet header 400 but are added in the expanded Ethernet packet header 400'.

FIG. 4C illustrates a bit vector 405 that represents the expanded Ethernet packet header 400' of FIG. 4B. Each bit of the bit vector 405 corresponds to one of the 22 bytes of the expanded Ethernet packet header 400'. The bit vector 405 contains 1's for all valid fields, which are the SA field, the DA field and the EtherType field. The bit vector 405 contains 0's for all invalid fields, which are the Service VLAN tag field and the Customer VLAN Tag field. Accordingly, the Ethernet packet header 400 is represented by the generic format of {22'111111_111111_0000_0000_11}.

As illustrated in FIGS. 2A-4C, irrespective of the variation of an incoming Ethernet header, once the expansion of the Ethernet header to the generic format is performed, field offsets are the same as the biggest sized Ethernet header (e.g., Ethernet packet header 200 of FIG. 2A). The header expansion advantageously allows for the same set of software commands to work, irrespective of the incoming Ethernet header since the Ethernet header is expanded to the biggest sized Ethernet header. As such, a layer command extracting, for example, the EtherType field will always point to the same offset irrespective of which Ethernet header was received.

In some embodiments, a compressed format is used to express which fields are present in any received header. The compact format is made of a combination of two fields, namely:
  contBytes: This indicates how many bytes are valid in the beginning of the layer; and
  validBytes: This is a bit vector which indicates the validity of each byte in the layer.
For example, if contBytes is eight and validBytes is 4'h0111, then the a respective layer includes bytes 0-7 that are valid, followed by a null byte and three valid bytes. Use of this compressed format helps save the number of bits that are required to represent the layer. The total number of bytes can be computed by an exemplary pseudo-code shown in Table 1.

TABLE 1

```
Total_length = contBytes;
for (i = 0; i < LENGTH_OF_VALID_BYTES; i++)
    if (validBytes[i])
        Total_length++;
```

Generic formats of headers result in hardware and software flexibility in terms of extracting fields from the packet headers. Hardware is able to extract fields from the packet headers irrespective of where fields reside within the packet headers. Hardware can be programmed by software to support new protocols. Software programs generic formats in a hardware table for various header protocols.

Once protocol headers are expanded, programmable layer commands allow fields from the packets to be extracted. Each layer has a set of N layer commands that is specific to the corresponding protocol. In some embodiments, each layer has eight programmable layer commands. Table 2 lists fields of each layer command. These fields are software defined.

TABLE 2

| Command Fields | Description |
| --- | --- |
| fieldOffset | Specifies offset within layer where field that needs to be extracted starts |
| fieldLen | Specifies number of bytes that should be extracted from the specified offset |

The generic layer commands allow the information in the packet to be extracted in a programmable manner. For example, comparing with traditional implementations, for Ethernet, to extract the MAC DA (MAC destination address), the layer command would specify an offset of 0 and a length of six bytes. This will result in the first six bytes, which carry the MAC DA, to be extracted from the layer. Similarly, to extract the IP DA, the layer command would specify an offset of 16 and a length of four bytes. This will result in the four bytes starting at the offset of 16, which carry the IP DA, to be extracted from the layer.

Figure 5:
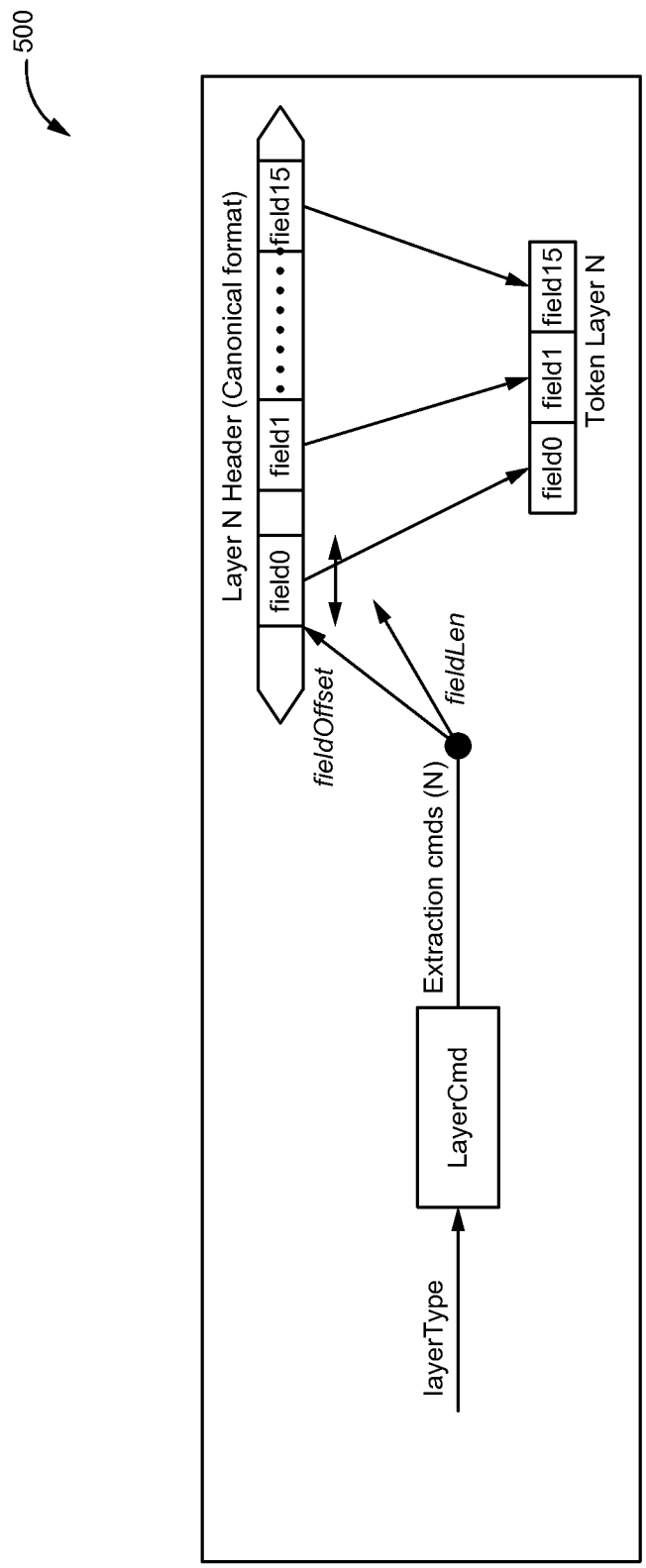
FIG. 5 illustrates a block diagram of data extraction from an expanded layer in accordance with some embodiments of the present invention.

FIG. 5 illustrates a block diagram 500 of data extraction from an expanded layer in accordance with some embodiments of the present invention. The expanded layer is labeled as "Layer N Header (Canonical Header)" in FIG. 5. The layer type, determined by the parser engine, is referenced in memory, which specifies one or more of the N layer commands for extracting fields from the expanded layer. Each layer command includes two fields: fieldOffset and fieldLen. In FIG. 5, a first layer command extracts field0, a second layer command extracts field1 and a third layer command extracts field15. The extracted information is stored in a bus, shown as "Token Layer N" in FIG. 5. The extracted fields are sequentially placed next to each other without any gaps between the extracted fields to form a token layer. In other words, the extracted fields are concatenated to form the token layer. The total length of the extracted information of any layer is the sum of all the fieldLen layer commands for that particular layer.

Figure 6:
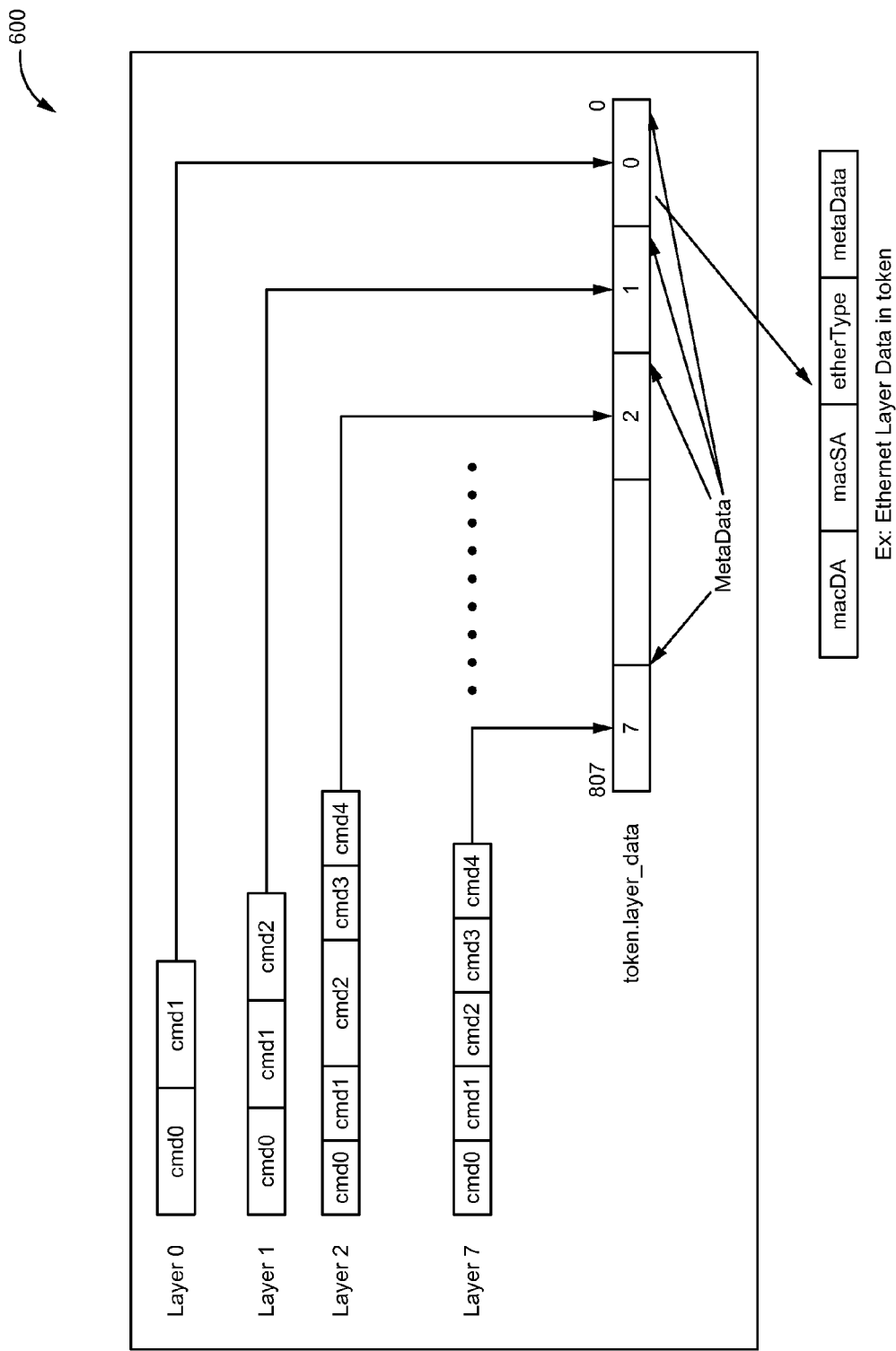
FIG. 6 illustrates a block diagram of extracted information from all layers concatenated together to form a single bus in accordance with some embodiments of the present invention.

FIG. 6 illustrates a block diagram 600 of extracted information from all layers concatenated together to form a single bus in accordance with some embodiments of the present invention. In FIG. 6, two layer commands (i.e., cmd0 and cmd1) are used to extract fields from Layer 0 to form Token Layer 0, three layer commands (i.e., cmd0, cmd1 and cmd2) are used to extract fields from Layer 1 to form Token Layer 1, and so forth. All token layers are sequentially placed next to each other without any gaps between the token layers to form a final token. In other words, Token Layer 0 to Token Layer 7 are concatenated to form the final token. The final token is typically used for further processing of the packet.

Figure 7A:
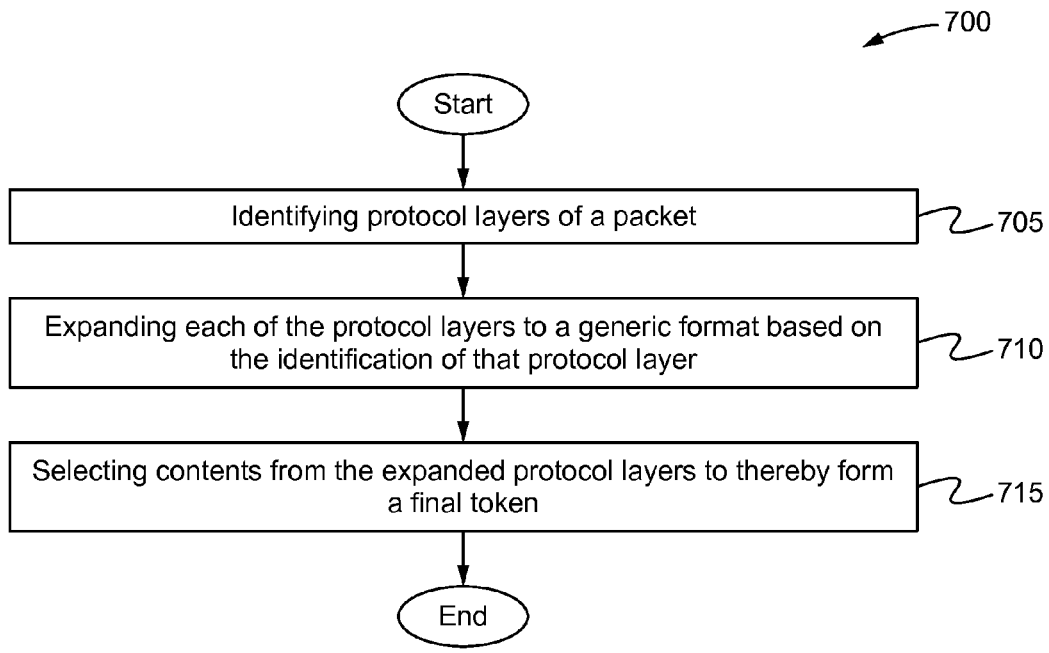
FIGS. 7A-7B illustrate methods of a parser engine in accordance with some embodiments of the present invention.

FIG. 7A illustrates a method 700 of the parser engine in accordance with some embodiments of the present invention. The parser engine is part of the network switch and identifies contents of network packets. Typically, the parser engine first splits the packet by protocol layer. At a step 705, protocol layers of a packet are identified. Each of the protocol layers of the packet is identified based on a unique layer type number of the protocol layer.

At a step 710, each of the protocol layers is expanded to a generic format based on the identification of that protocol layer. The generic format defines a super-set of all fields that the protocol layer can have. A bit vector is maintained for the expanded protocol layer. The bit vector includes a bit per byte for each byte of the expanded protocol layer. A bit is marked as available for each byte of each valid field, wherein each valid field is a field existing in the protocol layer of the packet. A bit is marked as unavailable for each byte of each invalid field, wherein each invalid field is a field that did not exist in the protocol layer of the packet. In some embodiments, a compressed format is used to express the expanded protocol layer.

At a step 715, contents from the expanded protocol layers are selected to thereby form a final token.

Figure 7B:
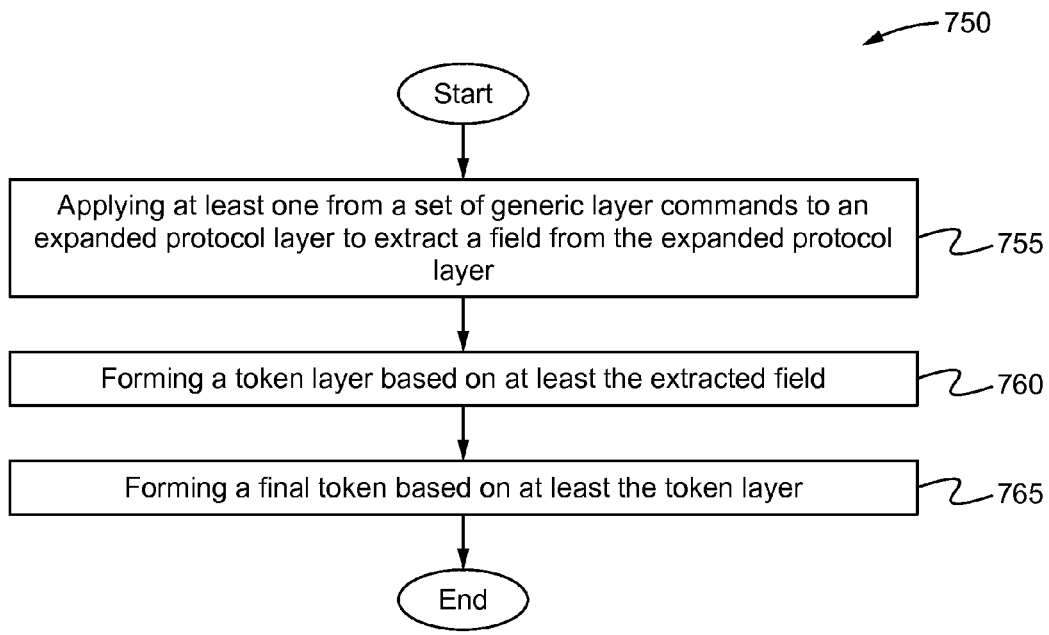

FIG. 7B illustrates another method 750 of the parser engine in accordance with some embodiments of the present invention. Typically, the parser engine performs the method 750 after the method 700. At a step 755, at least one from a set of generic layer commands is applied to an expanded protocol layer to extract a field from the expanded protocol layer. Fields of each of the generic layer commands are fieldOffset, which specifies offset within the expanded layer where a field to be extracted starts, and fieldLen, which specifies a number of bytes that should be extract from that specified offset. The fields of each of the generic layer commands are software defined.

At a step 760, a token layer is formed based on at least the extracted field. The token layer is formed by placing the extracted field together with other extracted fields from the expanded protocol layer without any gaps.

At a step 765, the final token is formed based on the token layer. The final token is formed by placing the token layer together with other token layers without any gaps. The final token is typically used for further processing of the packet.

Figure 8:
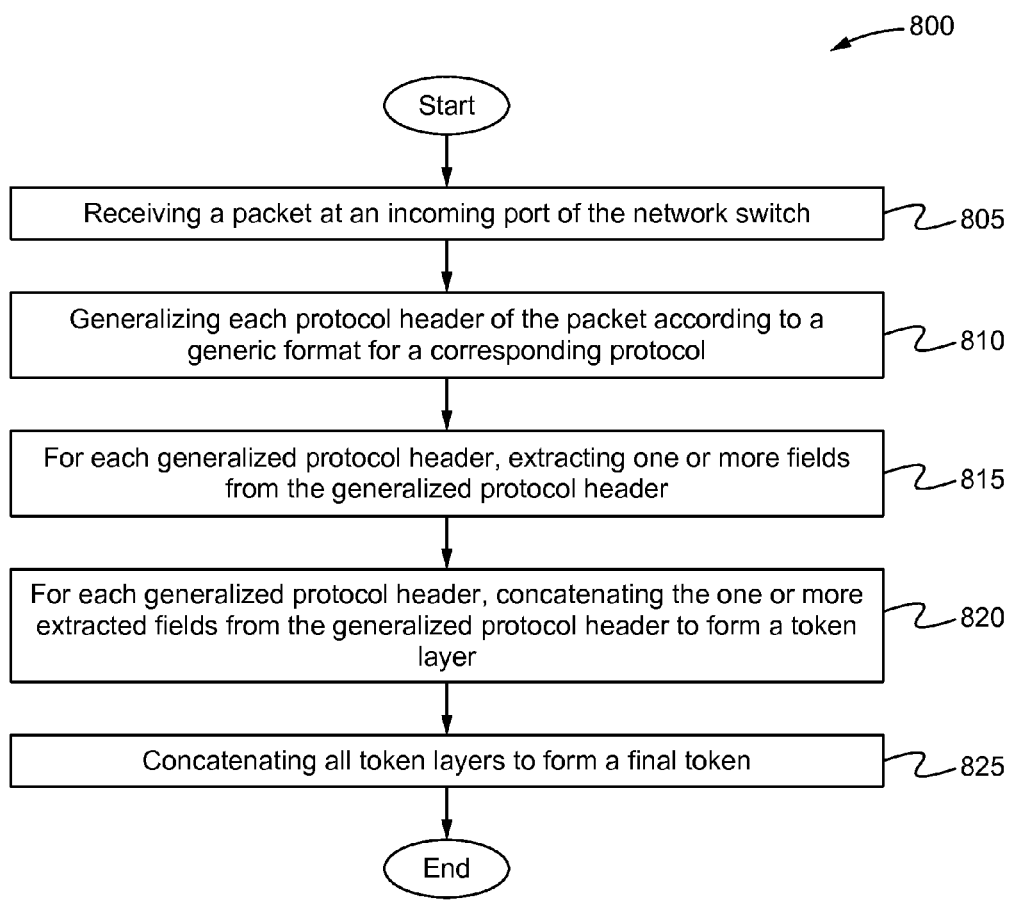
FIG. 8 illustrates a method of a network switch in accordance with some embodiments of the present invention.

FIG. 8 illustrates a method 800 of the network switch in accordance with some embodiments of the present invention. In some embodiments, the network switch allows for software-defined mappings of generic formats of protocols and stores the software-defined mappings in the memory of the network switch. At a step 805, a packet is received at an incoming port of the network switch.

At a step 810, each protocol header of the packet is generalized according to a generic format for a corresponding protocol. The parser engine determines a layer type of the protocol header and a variant of the layer type. The parser engine detects missing fields from the protocol based on the layer type and the variant. Based on the detection, the parser engine expands the protocol header to the generic format.

At a step 815, for each generalized protocol header, one or more fields from the generalized protocol header are extracted. To extract the one or more fields, one or more generic layer commands are applied to the generalized protocol header. Fields of each of the generic layer commands are fieldOffset, which specifies offset within the expanded layer where a field to be extracted starts, and fieldLen, which specifies a number of bytes that should be extract from that specified offset. The fields of each of the generic layer commands are typically programmed by software prior to the step 805.

At a step 820, for each generalized protocol header, the one or more extracted fields from the generalized protocol header are concatenated to form a token layer. The token layer is formed by placing the one or more extracted fields together without any gaps.

At a step 825, all token layers are concatenated to form a final token. The final token is formed by placing the token layer with other token layers together without any gaps. The final token is typically used for further processing of the packet.

Data from a packet is extracted using layer commands. Each layer of the layer is expanded to a generic format. Generic formats of headers result in hardware and software flexibility in terms of extracting fields from the packet headers since the layer commands are agnostic of the specific fields within the layers of the packet. Determination of where relevant information to be extracted lies within the packet no longer needs to be made at implementation time.

One of ordinary skill in the art will realize other uses and advantages also exist. While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. A method of implementing a parser engine, the method comprising:
   identifying one or more protocol layers of a packet, wherein each of the protocol layers have one or more fields;
   for each protocol layer of the protocol layers, expanding the protocol layer to a generic format having a predetermined number of fields based on the identification of the protocol layer thereby forming an expanded protocol layer; and
   selecting contents from each of the expanded protocol layers to thereby form a final token.

2. The method of claim 1, wherein each of the protocol layers has a unique layer type number and is identified based on the unique layer type number.

3. The method of claim 1, wherein the generic format defines a super-set of all fields that the protocol layers can have.

4. The method of claim 1, wherein the expanding of the protocol layer comprises:
   maintaining a bit vector for the expanded protocol layer, wherein the bit vector includes a bit for each byte of the expanded protocol layer such that each of the bits corresponds to one of the bytes of the expanded protocol layer;
   for each of the bits, setting the bit to a first value if the corresponding byte is a part of a valid field of the protocol layer, wherein each of the valid fields is a field existing in the protocol layer of the packet before the protocol layer has been expanded to the expanded protocol layer; and
   for each of the bits, setting the bit to a second value if the corresponding byte is a part of an invalid field of the protocol layer, wherein each of the invalid fields is a field that did not exist in the protocol layer of the packet before the protocol layer has been expanded to the expanded protocol layer.

5. The method of claim 4, further comprising using a compressed format to express the expanded protocol layer.

6. The method of claim 1, further comprising applying at least one from a set of generic layer commands to an expanded protocol layer to extract a field from the expanded protocol layer.

7. The method of claim 6, wherein fields of each of the generic layer commands are fieldOffset, which specifies offset within the expanded layer where a field to be extracted starts, and fieldLen, which specifies a number of bytes that should be extract from that specified offset.

8. The method of claim 6, wherein fields of each of the generic layer commands are software defined.

9. The method of claim 6, further comprising:
forming a token layer based on at least the extracted field; and
forming the final token based on at least the token layer.

10. The method of claim 9, wherein the token layer is formed by placing the extracted field together with other extracted fields from the expanded protocol layer without any gaps.

11. The method of claim 9, wherein the final token is formed by placing the token layer together with other token layers without any gaps.

12. A method of implementing network switch, the method comprising:
receiving a packet having a packet header at an incoming port of the network switch, wherein the packet header includes one or more protocol headers;
for each of the protocol headers, generalizing the protocol header to a generic format for a corresponding protocol thereby forming a generalized protocol header;
for each generalized protocol header, extracting one or more fields from the generalized protocol header;
for each generalized protocol header, concatenating the one or more extracted fields from the generalized protocol header to form a token layer; and
concatenating all token layers to form a final token.

13. The method of claim 12, wherein the network switch includes a parser engine configured to generalize each protocol header, to extract one or more fields from the generalized protocol header, to concatenate the one or more extracted fields from the generalized protocol header to form the token layer, and to concatenate all token layers to form the final token.

14. The method of claim 13, wherein the generalizing of the protocol header comprises:
the parser engine determining a layer type of the protocol header and a variant of the layer type;
the parser engine detecting missing fields from the protocol header based on the layer type and the variant; and
based on the detection, the parser engine expanding the protocol header to the generic format.

15. The method of claim 12, wherein extracting one or more fields comprises applying one or more generic layer commands to the generalized protocol headers.

16. The method of claim 15, wherein fields of each of the one or more generic layer commands are fieldOffset, which specifies offset within the generalized protocol header where a field to be extracted starts, and fieldLen, which specifies a number of bytes that should be extract from that specified offset.

17. The method of claim 15, further comprising, prior to receiving the packet, programming fields of each of the one or more generic layer commands via software.

18. The method of claim 12, further comprising, prior to receiving the packet:
allowing for software-defined mappings of generic formats of protocols; and
storing the software-defined mappings in a memory of the network switch.

19. A network switch comprising:
an input port and an output port for receiving and transmitting packets having headers including one or more protocol layers;
a memory for storing a set of software-defined mappings of generic protocol layer formats for one or more protocols, the generic protocol layer formats each having a predetermined number of fields, and for storing sets of generic layer commands for extracting desired fields from the protocol layers that have been converted into one of the generic protocol layer formats; and
a parser engine for:
performing a header generalization process on the header of each of the packets to generalize each of the protocol layers of the header of the packet according to one of the generic protocol layer formats thereby forming an expanded protocol layer; and
selecting contents from the generalized protocol headers to thereby form a final token.

20. The network switch of claim 19, wherein the header generalization process is used on different variants of protocol layers of one or more of the protocols.

21. The network switch of claim 19, wherein the header generalization process is used on different protocols of the protocols.

22. The network switch of claim 19, wherein after the packet is processed by the parser engine, the packet includes canonicalized protocol layers.

23. The network switch of claim 22, wherein each of the canonicalized protocol layers is one of the expanded protocol layers that was generalized based on one of the protocol layers of the header of the packet.

24. The network switch of claim 19, wherein the parser engine further applies at least one layer command from one of the sets of generic layer commands to each of the expanded protocol layers to extract one or more fields from the expanded protocol layers.

25. The network switch of claim 24, wherein the one of the set of generic layer commands is specific to the protocol of the expanded protocol layer to which the one of the set of generic layer commands is being applied.

26. The network switch of claim 24, wherein the fields that are to be extracted by each of the generic layer commands are software defined.

27. The network switch of claim 24, wherein all of the extracted fields from one of the expanded protocol layers are concatenated with each other to form a token layer.

28. The network switch of claim 27, wherein the token layer is concatenated with other token layers formed from a remainder of the expanded protocol layers derived from the packet to form a final token.

29. The network switch of claim 28, wherein the final token is used for further processing of the packet.

30. A parser engine comprising a circuit configured to:
identify one or more protocol layers of a packet, wherein each of the protocol layers have one or more fields;
for each protocol layer of the protocol layers, expand the protocol layer to a generic format having a predetermined number of fields based on the identification of the protocol layer thereby forming an expanded protocol layer; and select contents from each of the expanded protocol layers to thereby form a final token.

31. The parser engine of claim 30, wherein each of the protocol layers has a unique layer type number and is identified based on the unique layer type number.

32. The parser engine of claim 30, wherein the generic format defines a super-set of all fields that the protocol layers can have.

33. The parser engine of claim 30, wherein the circuit is also configured to apply at least one from a set of generic layer commands to the expanded protocol layer to extract one or more fields from the expanded protocol layer.

34. The parser engine of claim 33, wherein fields of each of the generic layer commands are fieldOffset, which specifies offset within the expanded protocol layer where a field to be extracted starts, and fieldLen, which specifies a number of bytes that should be extracted from that specified offset.

35. The parser engine of claim 33, wherein fields of each of the generic layer commands are software defined.

36. The parser engine of claim 33, wherein the circuit is also configured to form a token layer based on at least the extracted fields and to form the final token based on at least the token layer.

37. The parser engine of claim 36, wherein the token layer is formed by placing the extracted fields together without any gaps.

38. The parser engine of claim 36, wherein the final token is formed by placing the token layer together with other token layers without any gaps.

\* \* \* \* \*